US012194756B2

(12) United States Patent
LeFevre et al.

(10) Patent No.: US 12,194,756 B2
(45) Date of Patent: Jan. 14, 2025

(54) SYSTEM AND METHOD FOR OPERATING AN INKJET PRINTER TO ATTENUATE INK DRYING IN THE INKJETS DURING PRINTING OPERATIONS

(71) Applicant: Xerox Corporation, Norwalk, CT (US)

(72) Inventors: Jason M. LeFevre, Penfield, NY (US); Douglas K. Herrmann, Webster, NY (US); Seemit Praharaj, Webster, NY (US); Varun Sambhy, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 112 days.

(21) Appl. No.: 18/160,623

(22) Filed: Jan. 27, 2023

(65) Prior Publication Data

US 2024/0253361 A1 Aug. 1, 2024

(51) Int. Cl.
*B41J 2/21* (2006.01)

(52) U.S. Cl.
CPC .................................. *B41J 2/2103* (2013.01)

(58) Field of Classification Search
CPC ..................................................... B41J 2/2103
See application file for complete search history.

(56) References Cited

U.S. PATENT DOCUMENTS

| | | | |
|---|---|---|---|
| 5,659,342 A | 8/1997 | Und et al. | |
| 9,216,572 B2 | 12/2015 | Sudo et al. | |
| 9,895,893 B2 | 2/2018 | Yamazaki et al. | |
| 10,919,310 B1 * | 2/2021 | Schweid | B41J 29/393 |
| 2010/0091053 A1 | 4/2010 | Jackson et al. | |
| 2014/0176633 A1 | 6/2014 | Gerrits | |
| 2015/0328882 A1 | 11/2015 | Van Sas | |
| 2017/0361607 A1 | 12/2017 | Fortia et al. | |
| 2018/0297382 A1 | 10/2018 | MacKenzie et al. | |

* cited by examiner

*Primary Examiner* — Justin Seo
(74) *Attorney, Agent, or Firm* — Maginot Moore & Beck LLP

(57) ABSTRACT

An inkjet printer and method of operating the inkjet printer modifies the image content data for an ink image to be printed on a media sheet to maintain the operational status of each inkjet in the inkjet printer. For each inkjet that is operated less than an operational threshold, image data is added to the image content data to operate each inkjet at the operational threshold.

18 Claims, 3 Drawing Sheets

SYSTEM AND METHOD FOR OPERATING AN INKJET PRINTER TO ATTENUATE INK DRYING IN THE INKJETS DURING PRINTING OPERATIONS

TECHNICAL FIELD

This disclosure is directed to printheads that eject liquid ink to form ink images on substrates as they pass the printheads and, more particularly, to the operation of the inkjets during ink image printing to help maintain the operational status of the inkjets in the printheads.

BACKGROUND

Inkjet imaging devices eject liquid ink from printheads to form images on an image receiving surface. The printheads include a plurality of inkjets that are arranged in some type of array. Each inkjet has a thermal or piezoelectric actuator that is coupled to a printhead driver. The printhead controller generates firing signals that correspond to digital data for images. Actuators in the printheads respond to the firing signals by expanding into an ink chamber to eject ink drops onto an image receiving member and form an ink image that corresponds to the digital image used to generate the firing signals.

Inkjets, especially those in printheads that eject aqueous inks, need to regularly fire to help prevent the ink in the nozzles from drying. If the viscosity of the ink increases too much, the probability of an inkjet failure increases substantially. To maintain the operational status of the inkjets, each inkjet is periodically operated to eject single drops from each nozzle in some prescribed pattern onto a printed page. This pattern is designed to be below the visibility threshold of the viewer. If the pattern is too dense, however, the pattern may be perceptible and thus objectionable. If the pattern is not dense enough, the firing frequency of the inkjets may be insufficient to maintain the operational status of the inkjets. This method is typically referred to as "sneezing" or "background jetting." Inkjet printers would benefit from maximizing the number of ink drops in a sneeze pattern while minimizing the visibility of the pattern on the print.

SUMMARY

A new method of operating inkjets in an inkjet printer during printing operations maintains the operational status of the inkjets while minimizing the visibility of the pattern on the print. The method includes receiving image content data corresponding to an ink image to be formed a media sheet; identifying inkjets in the at least one printhead that are operated less than an operational threshold to form the ink image on the media sheet; identifying a difference between a number of times each identified inkjet is operated and the operational threshold; adding image data to the image content data for each identified inkjet that ejects a first color of ink, the added image data causing the identified inkjet to be operated to eject the first color of ink a number of times that corresponds to the identified difference; and operating the identified inkjets that eject the first color of ink in the at least one printhead using the image content data and the added image data to eject ink drops of the first color of ink into the ink image formed on the media sheet.

A new inkjet printer operates inkjets in an inkjet printer during printing operations to maintain the operational status of the inkjets while helping the pattern remain imperceptible. The new inkjet printer includes a media transport configured to carry media sheets through the inkjet printer; at least one printhead having a plurality of inkjets that are configured to eject ink drops onto the media sheets to form ink images on the media sheets as the media sheets pass the at least one printhead; a controller operatively connected to the at least one printhead. The controller is configured to receive image content data corresponding to an ink image to be formed on one of the media sheets; identify inkjets in the at least one printhead that are operated less than an operational threshold to form the ink image on the one media sheet; identify a difference between a number of times each identified inkjet is operated and the operational threshold; add image data to the image content data for each identified inkjet that ejects a first color of ink, the added image data causing the controller to operate the identified inkjet that ejects the first color of ink a number of times that corresponds to the identified difference; and operate the identified inkjets that eject the first color of ink in the at least one printhead using the image content data and the added image data to eject ink drops of the first color of ink into the ink image formed on the one media sheet.

BRIEF DESCRIPTION OF THE DRAWINGS

The foregoing aspects and other features of operating an inkjet printer to maintain the operational status of the inkjets while helping the pattern remain imperceptible are explained in the following description, taken in connection with the accompanying drawings.

DETAILED DESCRIPTION

Figure 1:
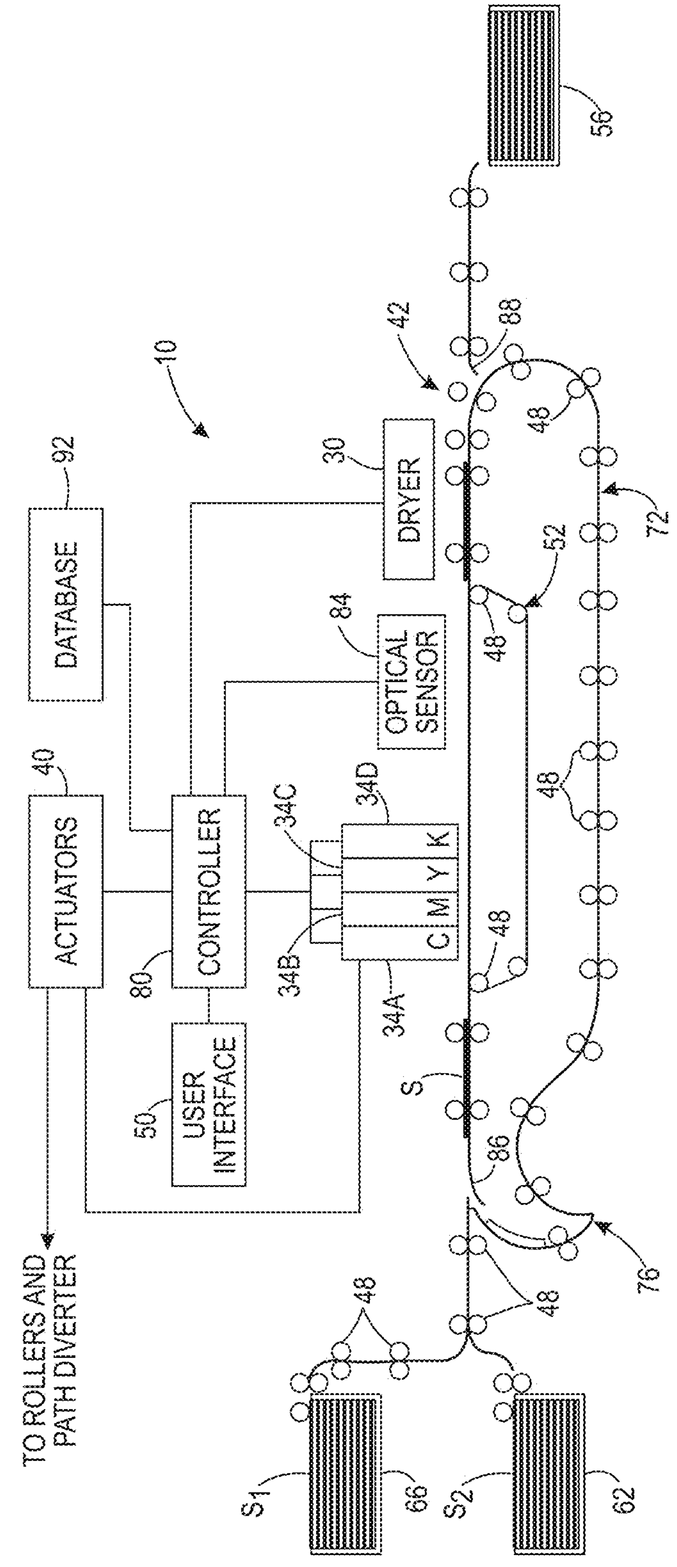
FIG. 1 depicts an inkjet printer that ejects ink drops imperceptibly to maintain the operational status of the inkjets in the printer.

For a general understanding of the environment for the system and method disclosed herein as well as the details for the system and method, reference is made to the drawings. In the drawings, like reference numerals have been used throughout to designate like elements. As used herein, the word "inkjet printer" encompasses any apparatus that produces ink images on media by operating inkjets in printheads to eject drops of ink toward the media. As used herein, the term "process direction" refers to a direction of travel of an image receiving surface, such as an imaging drum or print media, and the term "cross-process direction" is a direction that is substantially perpendicular to the process direction along the surface of the image receiving surface. As used in this document, the term "sneeze drop" or "sneeze drop ejection" refers to non-image ink drops ejected by identified inkjets to maintain the operational status of the inkjets in the printer.

The printer and method described below eject ink drops onto a media substrate on which an ink image is being formed at a rate to maintain the operational status of the inkjets in the printer. The printer and method first determine those inkjets that are being operated below an operational threshold. As used in this document, the term "operational threshold" means an empirically determined number of ink ejections sufficient to maintain the operational status of an inkjet. For those inkjets that eject yellow ink and were operated below the operational threshold, image data is added to the image content data that operates these inkjets to eject yellow ink drops into the image. This approach can be used for the yellow inkjets because the yellow ink drops are very difficult to observe humanly when the media is a low contrast with the yellow, such as is the case with white media sheets. The ink image content data for the image being printed is also analyzed to identify areas having a high coverage density. The inkjets that were operated below the operational threshold and that are positioned to eject ink drops into the areas identified as having a high coverage density are operated to eject ink drops into the identified areas until they have been operated at the operational threshold. The remainder of the inkjets that were operated below the operational threshold and are not positioned to eject ink drops into an area identified as having a high coverage density are divided into two groups of evenly numbered inkjets and oddly numbered inkjets. The inkjets in one of the two groups ejects ink drops up to the operational threshold at the leading edge of the ink image and the inkjets in the other of the two groups ejects ink drops up to the operational threshold at the trailing edge of the ink image. In this manner, all of the inkjets in the printer are operated at the operational threshold for each sheet printed in a print job unless extenuating circumstances occur, which are addressed further below.

FIG. 1 depicts a high-speed color inkjet printer 10 that operates each inkjet in the printer at least up to the operational threshold for each sheet printed to maintain the operational status of the inkjets. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone PZ of the printer. As used in this document, the term "print zone" means the area of the media transport opposite the printheads in the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

As shown in FIG. 1, after a substrate S is printed, it passes under an image dryer 30. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80 to identify image quality issues in the printed images generated by the printer. The optical sensor 84 can be a digital camera, an array of LEDs and photodetectors, or other devices configured to generate image data of a passing surface. In embodiments that print sheets of media, such as the printer shown in FIG. 1, the optical sensor 84 is positioned between the print zone and the dryer 30 as shown in FIG. 1. In printer embodiments that print a web of media, the optical sensor 84 can follow the dryer 30 in the process direction. As already noted, the media transport also includes a duplex path that can turn a sheet over and return it to the transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Additionally, the image content data is analyzed to identify those inkjets being operated a number of times less than the operational threshold and to identify areas having a high coverage density. For those inkjets that were not operated sufficiently to reach the operational threshold and that are positioned to eject ink drops into the areas identified as having a high coverage density, image data is generated and added to the image content data so these inkjets are operated to eject ink drops into the identified areas until they have been operated at the operational threshold. The remainder of the inkjets that have not been operated at the operational threshold level and are not positioned to eject ink drops into an area identified as having a high coverage density are divided into two groups of evenly numbered inkjets and oddly numbered inkjets. For those inkjets in one of the two groups, image data is generated and added to the image content data that operates those inkjets so they eject ink drops up to the operational threshold at the leading edge of the ink image and for those inkjets in the other of the two groups, image data is generated and added to the image content data that operates those inkjets so they eject ink drops up to the operational threshold at the trailing edge of the ink image. In this manner, all of the inkjets in the printer are operated at the operational threshold for each sheet printed in a print job unless extenuating circumstances occur, which are addressed further below.

Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet. The term "image data" means digital data added to the image content data to ensure each inkjet in the printer is operated a number of times up to the operational threshold.

Figure 2:
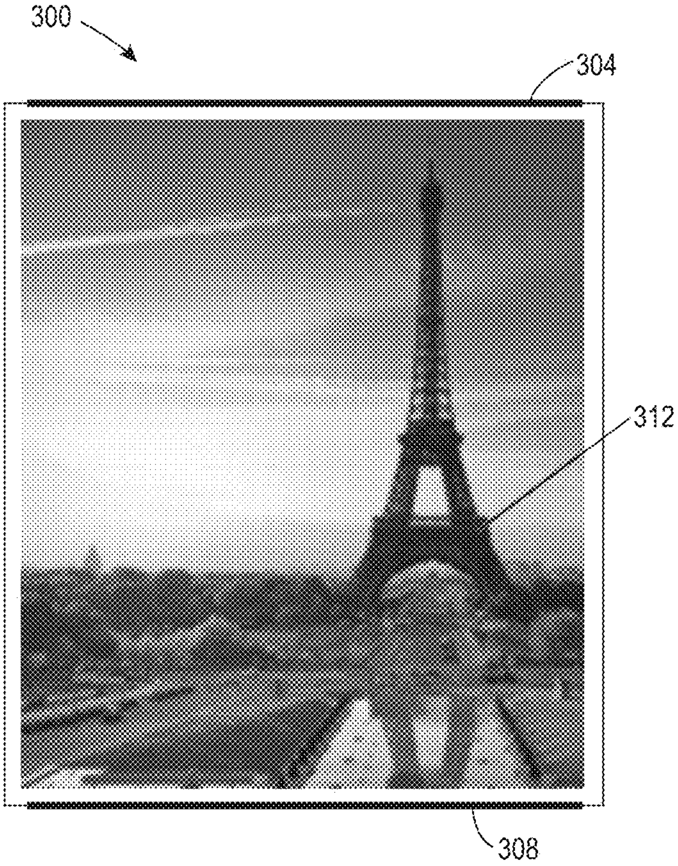
FIG. 2 is a depiction of a printed image on a media substrates that identifies the areas where ink drops are ejected to maintain the operational status of the inkjets.

An exemplary image is shown in FIG. 2. The image 300 depicts a tower 312 within a landscape. The image content data is analyzed to identify all of the inkjets that are operated below the operational threshold. For these inkjets that eject yellow ink drops, image data is added to the image content that operates these inkjets to eject yellow ink drops into the ink image up to the operational threshold to maintain their operational status. The image content data is also analyzed to identify the tower structure as a high coverage area. As used in this document, the term "high coverage area" refers to an area within an image in which 75% or more of the possible pixel locations in the area are printed. For those inkjets aligned with these areas of the tower structure and that have been operated below the operational threshold level, image data is added to the image content data sufficient to cause those inkjets to eject ink drops into the high coverage area a number of times corresponding to a difference between the operational threshold and the number of times the inkjet is operated to form a portion of the image. For those inkjets operated below the operational threshold level and aligned with an area having a relatively low coverage density, such as the sunlit area of the image, the number associated with the inkjet is identified as being even or odd. As known in the art, inkjets are numbered in a printhead to aid in the identification of inkjets for operational and maintenance purposes. For the even-numbered inkjets that were operated below the operational threshold and that are opposite an area that is not a high coverage area, image data is generated and added to the image content data that operates these inkjets up to the operational threshold to eject the ink drops at the leading edge 304 of the substrate. For the odd-numbered inkjets that were operated below the operational threshold and that are opposite an area that is not a high coverage area, image data is generated and added to the image content data that operates these inkjets up to the operational threshold to eject the ink drops at the trailing edge 308 of the substrate. Thus, each inkjet in the printer is operated at least at the operational threshold level to maintain the operational status of the inkjets.

Figure 3:
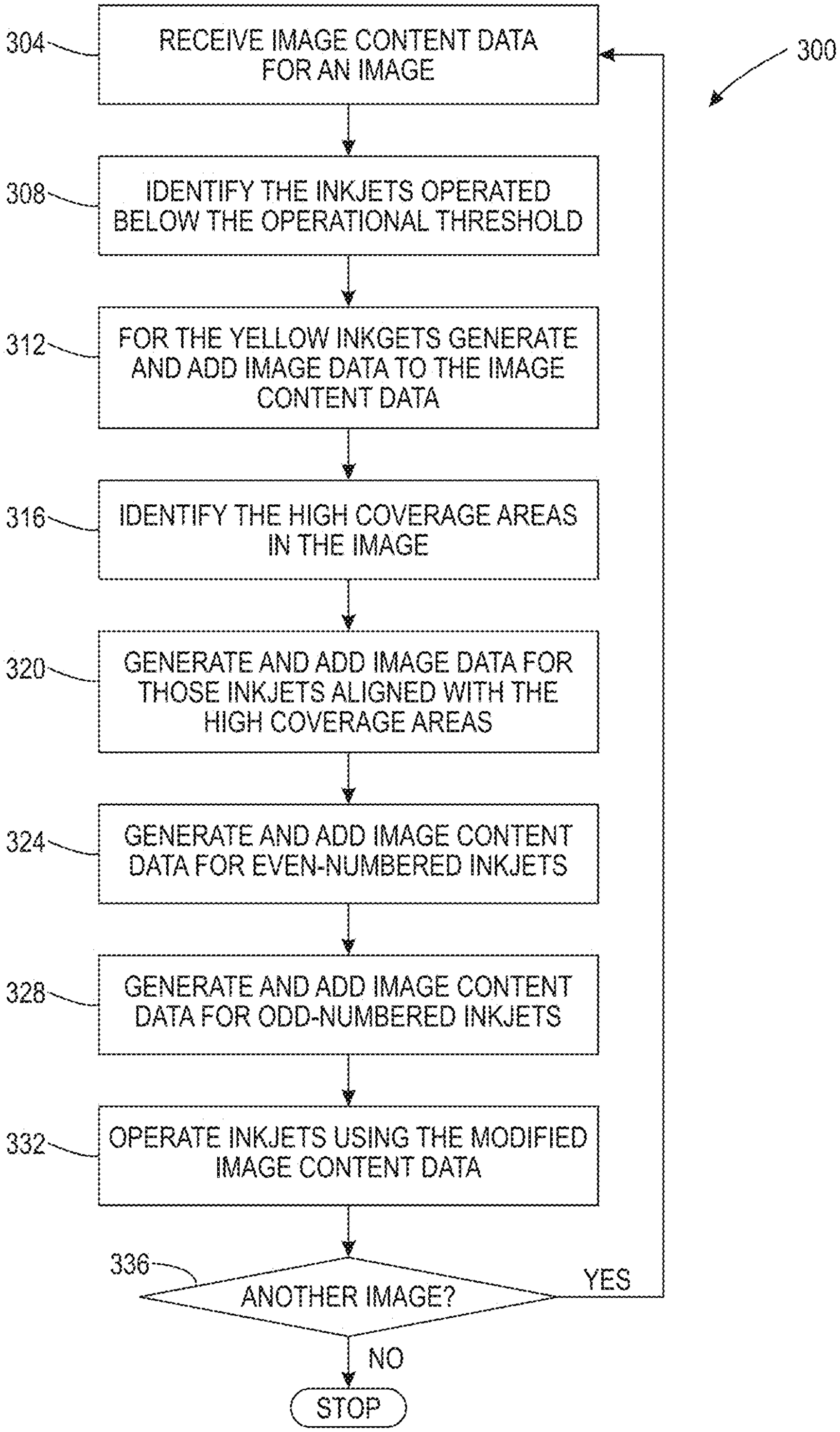
FIG. 3 is a flow diagram of a process used by the controller of the inkjet printer of FIG. 1 to eject ink drops into an ink image imperceptibly to maintain the operational status of the inkjets in the printer.

A process 300 that operates the inkjets in the printer at least at the operational threshold for each sheet printed in a print job is depicted in FIG. 3. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

The process 300 begins with the printer receiving image content data for an ink image to be printed (block 304). The image content data is analyzed to identify the inkjets that are operated below the operational threshold level (block 308). For the inkjets that eject yellow ink, image data is added to the image content data to operate these inkjets up to the threshold content (block 312). The image content data is also analyzed to identify the high coverage areas in the image content data (block 316). For those inkjets aligned with the identified high coverage areas and that have not been operated at the operational threshold level, image data is added to the image content data sufficient to cause those inkjets to eject ink drops in the high coverage area a number of times corresponding to a difference between the operational threshold and the number of times the inkjet is operated to form a portion of the image (block 320). For the even-numbered inkjets not operated at the operational threshold level and aligned with an area having a relatively low coverage density, image data is generated and added to the image content data that operates these inkjets up to the operational threshold to eject ink drops at the leading edge of the substrate (block 324). For the odd-numbered inkjets that were not operated at the operational threshold and that are opposite an area that is not a high coverage area, image data is generated and added to the image content data that operates these inkjets up to the operational threshold (block 328). The modified image data is then used to operate the inkjets to eject the operational threshold number of ink drops for each inkjet (block 332). The process is repeated for each image to be printed (block 336). Of course, the even-numbered inkjets could be operated to eject ink drops at the trailing edge of the substrate, while the odd-numbered inkjets could be operated to eject ink drops at the leading edge of the substrate. Also, if the number of odd-numbered inkjets or even-numbered inkjets used to print the leading or trailing edge exceeds a predetermined number, then a known sneeze pattern can be generated for the substrate being printed.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. An inkjet printer comprising:
- a media transport configured to carry media sheets through the inkjet printer;
- at least one printhead having a plurality of inkjets that are configured to eject ink drops onto the media sheets to form ink images on the media sheets as the media sheets pass the at least one printhead;
- a controller operatively connected to the at least one printhead, the controller being configured to:
  - receive image content data corresponding to an ink image to be formed on one of the media sheets;
  - identify inkjets in the at least one printhead that are operated less than an operational threshold to form the ink image on the one media sheet;
  - identify a difference between a number of times each identified inkjet is operated and the operational threshold;
  - add image data to the image content data for each identified inkjet that ejects a first color of ink, the added image data causing the controller to operate the identified inkjet that ejects the first color of ink a number of times that corresponds to the identified difference;
  - operate the identified inkjets that eject the first color of ink in the at least one printhead using the image content data and the added image data to eject ink drops of the first color of ink into the ink image formed on the one media sheet;
  - identify high coverage areas in the image content data;
  - identify the inkjets that are operated less than the operational threshold, do not eject the first color of ink, and are positioned to eject ink drops into the identified high coverage areas;
  - add image data to the image content data for each inkjet that is operated less than the operational threshold, that is positioned to eject ink drops into the identified high coverage areas, and that does not eject the first color of ink, the added image data causing the controller to operate the identified inkjets that are operated less than the operational threshold, are positioned to eject ink drops into the identified high coverage areas, and do not eject the first color of ink, a number of times that corresponds to the identified difference for each inkjet that is operated less than the operational threshold, is positioned to eject ink drops into the identified high coverage areas, and does not eject the first color of ink; and
  - operate the identified inkjets that are positioned to eject ink drops that are not the first color into the high coverage areas using the image content data and the added image data to eject ink drops that are not the first color of ink into the high coverage areas of the ink image formed on the one media sheet.

2. The inkjet printer of claim 1 wherein the first color of ink is yellow.

3. The inkjet printer of claim 1, the controller being further configured to:
- identify the inkjets that are operated less than the operational threshold, that are not positioned to eject ink drops into the identified high coverage areas, and that do not eject the first color of ink;
- add image data to the image content data for each inkjet that is operated less than the operational threshold, not positioned to eject ink drops into the identified high coverage areas, and that does not eject the first color of ink, the added image data causing the controller to operate the identified inkjet that is positioned to eject ink drops into areas outside an ink image of the one media sheet a number of times that corresponds to the identified difference for each inkjet that is operated less than the operational threshold, not positioned to eject ink drops into the identified high coverage areas, and that does not eject the first color of ink; and
- operate the inkjets that are operated less than the operational threshold, not positioned to eject ink drops into the identified high coverage areas, and that do not eject the first color of ink using the image content data and the added image data to eject ink drops that are not the first color of ink into the areas outside the ink image of the one media sheet.

4. The inkjet printer of claim 3, the controller being further configured to:
- separate the inkjets that are operated less than the operational threshold, that are not positioned to eject ink drops into the identified high coverage areas, and that do not eject the first color of ink into at least a first group of inkjets and a second group of inkjets; and
- add image data to the image content data that causes the first group of inkjets to be operated to eject ink drops into a first area that is outside the ink image of the one media sheet and that causes the second group of inkjets to be operated to eject ink drops into a second area that is outside the ink image of the one media sheet, the first area being different than the second area.

5. The inkjet printer of claim 4 wherein the inkjets in the first group of inkjets are even-numbered inkjets and the inkjets in the second group of inkjets are odd-numbered inkjets.

6. The inkjet printer of claim 5, the controller is further configured to:

add image data to the image content data that causes the controller to operate the inkjets in the first group of inkjets to eject ink drops into a leading edge of the one media sheet.

7. The inkjet printer of claim 6, the controller is further configured to:

add image data to the image content data that causes the controller to operate the inkjets in the second group of inkjets to eject ink drops into a trailing edge of the one media sheet.

8. The inkjet printer of claim 5, the controller is further configured to:

add image data to the image content data that causes the controller to operate the inkjets in the first group of inkjets to eject ink drops into a trailing edge of the one media sheet.

9. The inkjet printer of claim 8, the controller is further configured to:

add image data to the image content data that causes the controller to operate the inkjets in the second group of inkjets to eject ink drops into a leading edge of the one media sheet.

10. A method of operating inkjets in at least one printhead to maintain an operational status comprising:

receiving image content data corresponding to an ink image to be formed on a media sheet;

identifying inkjets in the at least one printhead that are operated less than an operational threshold to form the ink image on the media sheet;

identifying a difference between a number of times each identified inkjet is operated and the operational threshold;

adding image data to the image content data for each identified inkjet that ejects a first color of ink, the added image data causing the identified inkjet to be operated to eject the first color of ink a number of times that corresponds to the identified difference;

operating the identified inkjets that eject the first color of ink in the at least one printhead using the image content data and the added image data to eject ink drops of the first color of ink into the ink image formed on the media sheet;

identifying high coverage areas in the image content data;

identifying the inkjets that are operated less than the operational threshold, do not eject the first color of ink, and are positioned to eject ink drops into the identified high coverage areas;

adding image data to the image content data for each inkjet that is operated less than the operational threshold, that is positioned to eject ink drops into the identified high coverage areas, and that does not eject the first color of ink, the added image data operating the inkjets that are operated less than the operational threshold, are positioned to eject ink drops into the identified high coverage areas, and do not eject the first color of ink, a number of times that corresponds to the identified difference for each inkjet that is operated less than the operational threshold, is positioned to eject ink drops into the identified high coverage areas, and does not eject the first color of ink; and operating the identified inkjets that are positioned to eject ink drops that are not the first color into the high coverage areas using the image content data and the added image data to eject ink drops that are not the first color of ink into the high coverage areas of the ink image formed on the one media sheet.

11. The method of claim 10 wherein the first color of ink is yellow.

12. The method of claim 10 further comprising:

identifying the inkjets that are operated less than the operational threshold, that are not positioned to eject ink drops into the identified high coverage areas, and that do not eject the first color of ink;

adding image data to the image content data for each inkjet that is operated less than the operational threshold, not positioned to eject ink drops into the identified high coverage areas, and that does not eject the first color of ink, the added image data operating the inkjets that are positioned to eject ink drops into areas outside an ink image of the media sheet a number of times that corresponds to the identified difference for each inkjet that is operated less than the operational threshold, not positioned to eject ink drops into the identified high coverage areas, and that does not eject the first color of ink; and operating the inkjets that are operated less than the operational threshold, not positioned to eject ink drops into the identified high coverage areas, and that do not eject the first color of ink using the image content data and the added image data to eject ink drops that are not the first color of ink into the areas outside the ink image of the media sheet.

13. The method of claim 12 further comprising:

separating the inkjets that are operated less than the operational threshold, that are not positioned to eject ink drops into the identified high coverage areas, and that do not eject the first color of ink into at least a first group of inkjets and a second group of inkjets; and adding image data to the image content data that causes the first group of inkjets to be operated to eject ink drops into a first area that is outside the ink image of the media sheet and that causes the second group of inkjets to be operated to eject ink drops into a second area that is outside the ink image of the media sheet, the first area being different than the second area.

14. The method of claim 13 wherein the inkjets in the first group of inkjets are even-numbered inkjets and the inkjets in the second group of inkjets are odd-numbered inkjets.

15. The method of claim 14 further comprising:

adding image data to the image content data that causes the inkjets in the first group of inkjets to eject ink drops into a leading edge of the media sheet.

16. The method of claim 15 further comprising:

adding image data to the image content data that causes the inkjets in the second group of inkjets to eject ink drops into a trailing edge of the media sheet.

17. The method of claim 14 further comprising:

adding image data to the image content data that causes the inkjets in the first group of inkjets to eject ink drops into a trailing edge of the one media sheet.

18. The method of claim 17 further comprising:

adding image data to the image content data that causes the inkjets in the second group of inkjets to eject ink drops into a leading edge of the one media sheet.

* * * * *